United States Patent [19]

Cardullo et al.

[11] Patent Number: 4,597,325
[45] Date of Patent: Jul. 1, 1986

[54] ROTARY COOKING APPARATUS

[75] Inventors: Mario Cardullo, Alexandria; Mark Caraluzzi, Vienna; Peter Schildbach, Alexandria, all of Va.

[73] Assignee: Yankee Noodle Dandy, Inc., Alexandria, Va.

[21] Appl. No.: 722,365

[22] Filed: Apr. 12, 1985

[51] Int. Cl.$^4$ ............................................. A47J 37/00
[52] U.S. Cl. ........................................ 99/404; 99/408; 99/416
[58] Field of Search .............. 99/403, 404, 408, 409, 99/330, 348, 416, 417; 426/523; 366/214; 134/158

[56] References Cited

U.S. PATENT DOCUMENTS

| | | |
|---|---|---|
| 2,010,219 | 8/1935 | Cicero et al. . |
| 2,967,474 | 1/1961 | Ford . |
| 3,020,824 | 2/1962 | Pantermoller . |
| 3,036,513 | 5/1962 | Reeves ................................ 99/404 |
| 3,131,622 | 5/1964 | Rhyne ................................ 99/330 |
| 3,635,148 | 1/1972 | Fenerli . |
| 3,861,286 | 1/1975 | Albright et al. . |
| 4,205,600 | 6/1980 | Garrett . |
| 4,296,310 | 10/1981 | Luebke ............................. 99/330 X |
| 4,437,395 | 3/1984 | Speaker . |

Primary Examiner—Billy J. Wilhite
Attorney, Agent, or Firm—Spencer & Frank

[57] ABSTRACT

A cooking apparatus has a circular cooking vessel, an overflow situated at an upper portion of the cooking vessel for removing water and starch or scum from a top part of the water bath in the vessel, a heater situated in the cooking vessel for maintaining the water bath at a desired predetermined temperature and a horizontal circular plate arranged on the circular cooking vessel and covering the open top thereof. The plate has a plurality of circularly distributed apertures. There is further provided a variable-speed motor connected to the circular plate for rotating it at a selected speed. A plurality of perforated cooking baskets fit into respective apertures of the plate. Each basket has a handle for manually removing the basket from and inserting it into a respective aperture; and a configuration cooperating with the plate for suspending the basket from the plate for submersion into the water bath.

7 Claims, 4 Drawing Figures

ROTARY COOKING APPARATUS

BACKGROUND OF THE INVENTION

This invention relates to a cooking apparatus, particularly for use in the restaurant trade to prepare freshly cooked food such as pasta or vegetables for immediate serving. The apparatus is of the type that includes a rotary structure supporting removable baskets which are charged with the foodstuff to be cooked and which travel in a circular path, submerged in the cooking medium.

Rotary cooking apparatuses of the above-outlined general type are known. They are of complex construction and are further lacking an effective arrangement for automatically skimming starch, scum or other residues from the top of the cooking medium.

SUMMARY OF THE INVENTION

It is an object of the invention to provide an improved cooking apparatus of the above-outlined type which has a significantly simplified construction and which ensures a continuous cooking of the foodstuff while exposing the same to a multiple agitation.

This object and others to become apparent as the specification progresses, are accomplished by the invention, according to which, briefly stated, the cooking apparatus has a circular cooking vessel, an overflow situated at an upper portion of the cooking vessel for removing water and starch or scum from a top part of the water bath in the vessel, a heater situated in the cooking vessel for maintaining the water bath at a desired predetermined temperature and a horizontal circular plate arranged on the circular cooking vessel and covering the open top thereof. The plate has a plurality of circularly distributed apertures. There is further provided a variable-speed motor connected to the circular plate for rotating it at a selected speed. A plurality of perforated cooking baskets fit into respective apertures of the plate. Each basket has a handle for manually removing the basket from and inserting it into a respective aperture and a configuration cooperating with the plate for suspending the basket from the plate for submersion into the water bath.

DESCRIPTION OF THE PREFERRED EMBODIMENT

Figure 1:
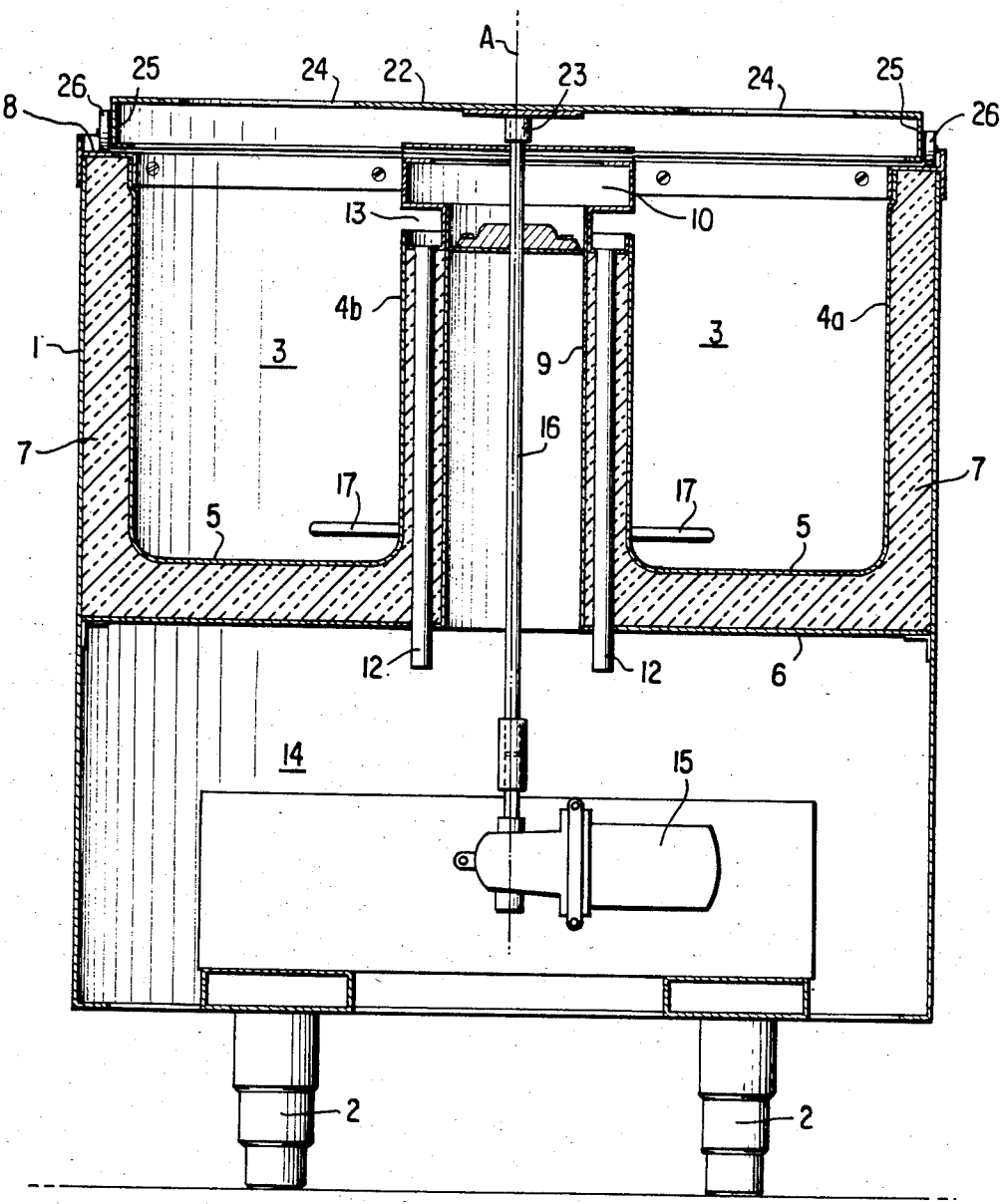
FIG. 1 is a sectional axial elevational view of a preferred embodiment of the invention.

Turning now to FIG. 1, the apparatus shown therein has an outer cylindrical metal casing 1 supported on a floor by legs 2 and having a central vertical axis A. An annular cooking vessel 3 is stationarily mounted within the outer casing 1 in a coaxial relationship therewith. The annular cooking vessel 3 has an outer cylindrical wall 4a, an inner cylindrical wall 4b and a bottom 5 which together define a space for the cooking medium, such as water. The cooking vessel 3 is spaced from the outer casing 1 and from a horizontal annular lower transverse plate 6; the space accommodates heat insulation 7. The upper circular outer edge of the casing 1 and that of the outer cylindrical wall 4a is bridged by an annular closure rim 8 whose upper face serves—as will be described later—as a horizontal annular guide track. The inner cylindrical vessel wall 4b surrounds a vertically oriented hollow mounting column 9 carrying, at its top, a mounting head 10. Between the inner cylindrical wall 4b and the hollow mounting column 9 there is defined an overflow drain 12 which, immediately underneath the mounting head 10, has an overflow inlet opening 13 communicating with the space for the cooking medium in the upper region thereof.

The outer casing 1 and the transverse plate 6 define a lower drive housing chamber 14 which accommodates a variable-speed drive motor 15 having a vertical output shaft 16 rotatably supported in the mounting head 10.

Figure 2:
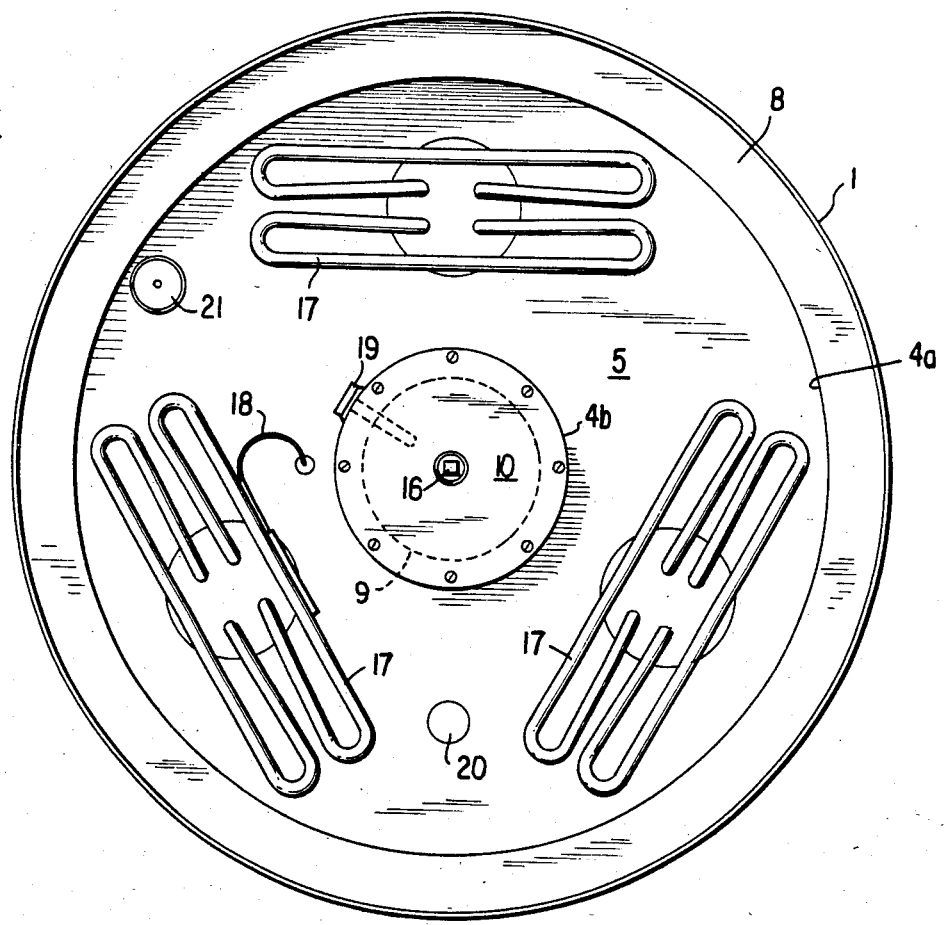
FIG. 2 is a top plan view of the structure illustrated in FIG. 1, with a component removed for clarity.

Also turning now to FIG. 2, there is illustrated therein, in top plan view, the annular bottom wall 5 of the cooling vessel 3. The bottom wall 5 supports a plurality of circularly distributed heater coils 17, at least one being associated with a temperature sensor 18. The inner cylindrical wall 4b of the vessel 3 supports a water fill inlet 19 situated in the vicinity of the bottom 5. In the latter there is further provided a tank drain 20 as well as a safety float 21 which de-energizes the heater coils 17 if the water level in the vessel 3 drops below a predetermined minimum level.

Figure 3:
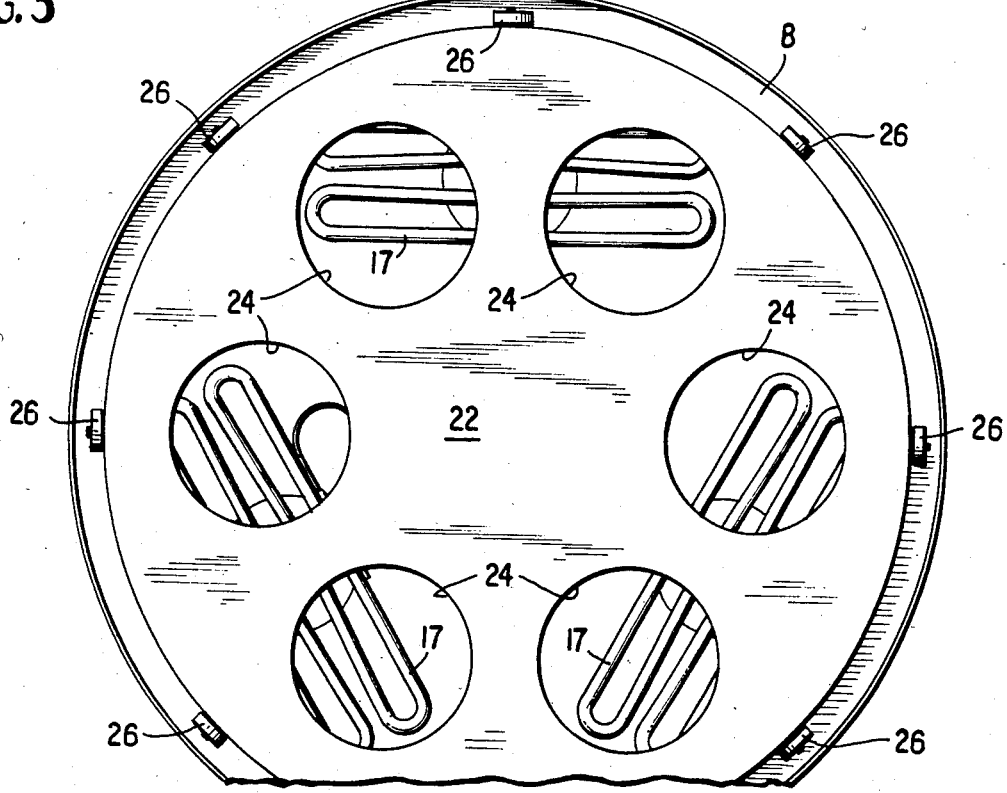
FIG. 3 is a top plan view of the structure illustrated in FIG. 1.

With particular reference to FIGS. 1 and 3, the vessel 3 is covered by a horizontally arranged circular plate 22 having, at its underside, a central socket 23 which upwardly readily removably, but torque-transmittingly fits over the top part of the output shaft 16. The circular plate 22 has a plurality of circular apertures 24 arranged in a circular array concentrically with respect to the socket 23. The circular plate 22 has a skirt 25, on the outside of which there are supported, in a uniform distribution, a plurality of runner rollers 26 which support the circular plate 22 on the track of the annular closure rim 8 and provide for a low-friction rotary displaceability of the circular plate 22.

Figure 4:
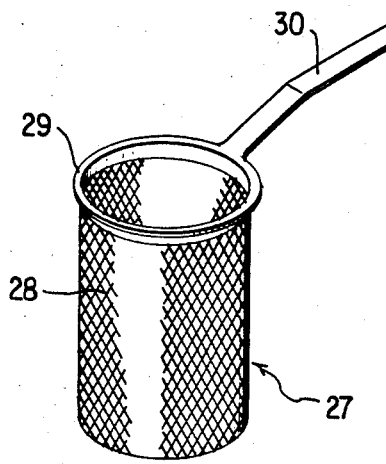
FIG. 4 is a perspective view of a component of the preferred embodiment.

Turning now to FIG. 4, into each circular aperture 24 there fits a basket generally designated at 27 and formed essentially of a cylindrical body 28 which may be of perforated sheet metal or a wire mesh, an upper rim 29 and a handle 30 extending from the rim 29. The baskets 27 interchangeably fit into any of the circular apertures 24 and are suspended therefrom by virtue of the fact that the outer diameter of the upper rim 29 is greater than the diameter of the circular apertures 24. When in such suspended position, the basket body 28 projects deeply into the vessel 3. The baskets 27 may thus be manually lowered into and lifted out from a respective circular aperture 24.

On the outer surface of the outer casing 1 there is secured a control panel (not shown) on which an on-off switch as well as a speed control knob for the drive motor 15, a water temperature controlling thermostat associated with the temperature sensor 18, as well as hand wheels for valves associated with the water fill inlet 19 as well as the tank drain 20 are provided. This control equipment is of conventional nature by itself and is therefore not illustrated or described in more detail.

Exemplary dimensions of the described apparatus may be as follows:

| | |
|---|---|
| Overall height of the apparatus: | 36 inches |
| Diameter of the outer casing 1: | 30 inches |
| Depth of the vessel 3: | 13½ inches |
| Diameter of the circular plate 22: | 28 inches |
| Diameter of the circular apertures 24: | 6¼ inches |

Preparatory to the operation of the above-described cooking apparatus, the water fill inlet 19 is opened and the vessel 3 is filled with water. At the same time, the heater coils 17 are energized, and when the water reaches the desired cooking temperature which, in case of cooking pasta, is preferably in a boiling state, the drive motor 15 is energized whereupon the circular plate 22 is set in continuous rotation according to a speed set on the control panel. One or more baskets 27 are charged with the food stuff to be cooked, such as pasta, and, if not yet in place, are introduced in a respective aperture 24.

The cooking process is performed while the circular plate 22 rotates and thus the baskets 27 travel horizontally through the hot (boiling) water. It is preferred to arrange for a continuous fresh water inflow through the water fill inlet 19 to thus obtain a continuous upwardly flowing water circulation, whereby the water raising beyond the level of the overflow inlet opening 13 is drained. This also causes substance such as scum or starch accumulating on the surface to be continuously skimmed by overflow drainage.

Thus, advantageously, the food substance to be cooked is exposed to a multiple agitation due to the currents generated by the boiling state of the water, the eddy currents due to the horizontal travel of the baskets through the hot water bath as well as due to the upflowing water stream.

The rotary speed of the circular plate 22 may be advantageously set, for example, at 0.75 rpm which will result in an appropriate cooking of fresh pasta during one full revolution.

After the foodstuff in any particular basket 27 has been sufficiently cooked, the respective basket 27 is removed from the circular plate 22 and its contents emptied, whereupon the basket is ready for a new charge to be cooked.

It will be understood that the above description of the present invention is susceptible to various modifications, changes and adaptations, and the same are intended to be comprehended within the meaning and range of equivalents of the appended claims.

What is claimed is:

1. A cooking apparatus comprising
    (a) a circular cooking vessel having a bottom, an open top and a vertical central axis;
    (b) filling means for introducing water into said cooking vessel to establish a water bath therein;
    (c) overflow means having an inlet opening situated at an upper portion of said cooking vessel for removing water and starch or scum from a top part of said water bath;
    (d) heating means situated in said cooking vessel for maintaining the water bath at a desired predetermined temperature;
    (e) a horizontal circular plate arranged on the circular cooking vessel and covering the open top thereof; said plate having a plurality of circularly distributed apertures and a center traversed by said axis;
    (f) support means for supporting said plate for rotation about said vertical axis;
    (g) variable-speed motor means operatively connected to said circular plate for rotating said circular plate about said vertical axis at a selected speed; and
    (h) a plurality of perforated cooking baskets each fitting in a respective said aperture of said plate; each said basket having
        (1) a handle for manually removing the basket from and inserting it into a respective said aperture; and
        (2) means cooperating with said plate for suspending the basket, fitted into a respective said aperture, from said plate.

2. A cooking apparatus as defined in claim 1, wherein said apertures and said baskets have a circular outline.

3. A cooking apparatus as defined in claim 1, wherein said heating means comprise heating elements mounted on the bottom of said cooking vessel.

4. A cooking apparatus as defined in claim 1, wherein said support means comprises an annular rim supported stationarily above said vessel concentrically with said vertical axis and a plurality of runner rollers rotatably mounted about a periphery of said circular plate; said runner rollers being in a rolling engagement with said annular rim.

5. A cooking apparatus as defined in claim 1, wherein said cooking vessel has an outer cylindrical wall and an inner cylindrical wall surrounded by said outer cylindrical wall; said outer and inner cylindrical walls being coaxial with said vertical axis and together defining, with said bottom, an annular volume to be occupied by said water bath.

6. A cooking apparatus as defined in claim 5, wherein said, motor means includes a vertically oriented output shaft surrounded by said inner cylindrical wall and torque-transmittingly connected to said circular plate at the center thereof.

7. A cooking apparatus as defined in claim 5, wherein said overflow means comprises a vertically oriented drain channel surrounded by said inner cylindrical tube.

* * * * *